United States Patent
Hagen

(10) Patent No.: US 9,631,586 B2
(45) Date of Patent: Apr. 25, 2017

(54) METHOD FOR SUCTIONING LIQUID FUEL FROM A LIQUID TRAP IN A FUEL TANK; AND FUEL SYSTEM FOR A MOTOR VEHICLE

(71) Applicant: AUDI AG, Ingolstadt (DE)

(72) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 153 days.

(21) Appl. No.: 14/720,011

(22) Filed: May 22, 2015

(65) Prior Publication Data

US 2015/0337777 A1    Nov. 26, 2015

(30) Foreign Application Priority Data

May 23, 2014 (DE) .......................... 10 2014 007 694

(51) Int. Cl.
| | | |
|---|---|---|
| *F02M 33/08* | (2006.01) | |
| *F02M 33/04* | (2006.01) | |
| *F02M 33/02* | (2006.01) | |
| *B60K 15/035* | (2006.01) | |
| *F02M 37/00* | (2006.01) | |

(52) U.S. Cl.
CPC ....... *F02M 33/08* (2013.01); *B60K 15/03504* (2013.01); *F02M 33/02* (2013.01); *F02M 33/04* (2013.01); *F02M 37/0082* (2013.01); *B60K 2015/03509* (2013.01); *B60K 2015/03514* (2013.01)

(58) Field of Classification Search
CPC ........ F02M 33/02–33/08; F02M 25/08; F02M 25/089; F02M 2025/0863; F02D 431/003–431/0045; F02D 41/003–41/004; B60K 15/035–15/03519; B60K 2015/03523–2015/03595
USPC .................................. 123/518–521; 137/587
See application file for complete search history.

(56) References Cited

U.S. PATENT DOCUMENTS

| | | | | |
|---|---|---|---|---|
| 3,698,160 A | * | 10/1972 | Hunter | .................. B01D 53/34 137/43 |
| 5,431,144 A | | 7/1995 | Hyodo | |

(Continued)

FOREIGN PATENT DOCUMENTS

| | | |
|---|---|---|
| DE | 198 59 117 A1 | 7/1999 |
| DE | 199 25 728 A1 | 12/2000 |

(Continued)

OTHER PUBLICATIONS

European Search Report with respect to counterpart European patent application EP 15 00 1384.

(Continued)

*Primary Examiner* — Erick Solis
*Assistant Examiner* — Robert Werner
(74) *Attorney, Agent, or Firm* — Henry M. Feiereisen LLC

(57) ABSTRACT

A method for suctioning liquid fuel from a liquid trap in a fuel tank of a motor vehicle, includes generating a negative pressure in a gas compartment or headspace of the fuel tank, applying the negative pressure to the liquid trap through a suction line, wherein the liquid trap has a collection container collecting liquid fuel during venting of the fuel tank, and at least partially suctioning the liquid fuel located in the collection container through the suction line into the gas compartment or headspace.

11 Claims, 5 Drawing Sheets

(56) References Cited

U.S. PATENT DOCUMENTS

| | | | | |
|---|---|---|---|---|
| 5,462,100 | A * | 10/1995 | Covert | B60K 15/03504 |
| | | | | 137/43 |
| 6,000,426 | A | 12/1999 | Tuckey et al. | |
| 6,089,249 | A | 7/2000 | Thibaut et al. | |
| 6,557,581 | B2 * | 5/2003 | Ehrman | B60K 15/03519 |
| | | | | 137/202 |
| 6,868,808 | B2 | 3/2005 | Brunemann et al. | |
| 7,779,820 | B2 * | 8/2010 | Rittershofer | B60K 15/03519 |
| | | | | 123/516 |
| 9,239,032 | B2 * | 1/2016 | Hagen | F02M 25/08 |
| 2008/0295809 | A1 * | 12/2008 | Hochstein | F02M 37/20 |
| | | | | 123/518 |
| 2012/0160218 | A1 * | 6/2012 | Hagen | B60K 37/04 |
| | | | | 123/519 |
| 2012/0179354 | A1 * | 7/2012 | Hagen | B60K 15/03519 |
| | | | | 701/102 |
| 2014/0123961 | A1 | 5/2014 | Kragh | |
| 2014/0216420 | A1 | 8/2014 | Hagen | |

FOREIGN PATENT DOCUMENTS

| | | |
|---|---|---|
| DE | 101 48 057 A1 | 4/2003 |
| DE | 699 08 681 T2 | 4/2004 |
| DE | EP 1 518 739 A2 | 3/2005 |
| DE | 10 2007 016 765 A1 | 10/2008 |
| DE | 10 2008 025304 A1 | 2/2009 |
| DE | 10 2011 106 006 A1 | 1/2013 |

OTHER PUBLICATIONS

Translation of European Search Report with respect to counterpart European patent application EP 15 00 1384.

* cited by examiner

METHOD FOR SUCTIONING LIQUID FUEL FROM A LIQUID TRAP IN A FUEL TANK; AND FUEL SYSTEM FOR A MOTOR VEHICLE

CROSS-REFERENCES TO RELATED APPLICATIONS

This application claims the priority of German Patent Application, Serial No. 10 2014 007 694.6, filed May 23, 2014, pursuant to 35 U.S.C. 119(a)-(d), the disclosure of which is incorporated herein by reference.

BACKGROUND OF THE INVENTION

The invention relates to a method for suctioning liquid fuel from a liquid trap in a fuel tank of a motor vehicle, in which liquid fuel is separated and collected in a collection chamber during ventilation of the fuel tank. The invention further relates to a fuel system for a motor vehicle, including a fuel tank, a liquid trap situated in the fuel tank for separating liquid fuel during ventilation of the fuel tank, wherein the liquid trap includes a collection chamber for the extracted fuel.

The following discussion of related art is provided to assist the reader in understanding the advantages of the invention, and is not to be construed as an admission that this related art is prior art to this invention.

Fuel tanks of modern motor vehicles are usually designed as pressure tanks that are provided with a tank venting system, which on one hand prevents that an undesirable positive or negative pressure is established as a result of evaporation or condensation of fuel in the gas compartment or headspace due an increase or decrease of the ambient temperature, and on the other hand allows escape of the gas or gas mixture displaced by the fuel from the gas compartment or headspace of the fuel tank during refueling.

The tank venting system may include several tank vent valves distributed in the gas compartment or headspace, a liquid trap situated within the tank and connected by lines to the tank vent valves, a tank shutoff valve connected to the liquid trap, and an activated carbon filter situated outside of the tank between the tank shutoff valve and the environment. The tank shutoff valve is usually closed and is opened when refueling the fuel tank to carry the gas mixture that is displaced by the fuel from the gas compartment or headspace to the activated carbon filter which prevents an undesirable leakage of hydrocarbons into the environment.

Due to the fact that the gas or gas mixture displaced by the fuel during venting of the fuel tank does not only contain volatile but also liquid components of hydrocarbons in the form of small droplets that may damage the activated carbon filter, they have to be separated before the gas mixture escapes from the fuel tank. This function is fulfilled by the liquid trap, which is designed as a liquid separator or siphon. The liquid trap is usually situated within the fuel tank and communicates with the tank vent valves and the tank shutoff valve. In order to ensure a proper refueling of the fuel tank, the liquid fuel separated in the liquid trap has to be suctioned off, which in many tank venting devices is accomplished by an ejector pump, as for instance disclosed in EP 1 518 739 A2.

However, ejector pumps have several drawbacks. For example ejector pumps are pressure-sensitive and may not properly function in the case of a pressure decrease or pressure regulation in the fuel tank. They are also permanently consuming energy without significantly emptying the collection container and also require a complex construction to avoid leakages and an entering of fuel into the at least temporarily submerged liquid traps.

It would therefore be desirable and advantageous to provide an improved fuel system so that emptying of the liquid trap is possible also without the need for ejector pumps and in a simple manner.

SUMMARY OF THE INVENTION

According to one aspect of the present invention, a method for suctioning liquid fuel from a liquid trap in a fuel tank of a motor vehicle, includes generating a negative pressure in a gas compartment or headspace of the fuel tank; applying the negative pressure to the liquid trap through a suction line, wherein the liquid trap has a collection container collecting liquid fuel during venting of the fuel tank; and at least partially suctioning the liquid fuel located in the collection container through the suction line into the gas compartment or headspace.

Within the scope of this patent application, the term "negative pressure" describes a negative pressure difference between the gas compartment or headspace of the fuel tank and the inside of the liquid trap.

The invention is based on the idea to use the positive pressure gradient between the liquid trap and the gas compartment or headspace that exists in the case of negative pressure in the gas compartment or headspace of the fuel tank in order to suction the liquid fuel from the collection container of the liquid trap, instead of using an ejector pump.

When the fuel tank is designed as a gas-tight tank, the negative pressure in the gas compartment or headspace may be advantageously generated either through the natural cooling of the fuel tank when ambient temperatures decrease and/or through the consumption of liquid fuel in an internal combustion engine of the motor vehicle. In the first case, the pressure in the gas compartment or headspace decreases due to a condensation of fuel vapors, whereas, in the latter case, the pressure decreases due to the decline of the fuel level which causes an increase of the volume of the gas compartment or headspace increases. When the suction line enters the liquid trap or the collection container from below so that liquid fuel may enter the suction line from that location, the liquid fuel is suctioned during the pressure decline from the liquid trap or the collection container towards the gas compartment or headspace until a pressure compensation is established.

According to an advantageous embodiment of the invention, in the case the amount of fuel suctioned from the liquid trap is insufficient to empty the liquid trap, the suctioning of the liquid fuel from the liquid trap may be supported by opening the tank shutoff valve or tank isolating valve between the liquid trap and the activated carbon filter when a negative pressure difference exists between the pressure in the gas compartment or headspace and the liquid trap on one hand and the atmospheric pressure or ambient pressure on the other hand. As a result of the lower pressure in the gas compartment or headspace, air flows through the activated carbon filter and the isolating valve into the liquid trap when the tank shutoff or isolating valve is opened, and displaces liquid fuel towards the gas compartment or headspace. This measure additionally generates a "negative pressure" in the gas compartment or headspace, namely a negative pressure difference between the gas compartment or headspace of the fuel tank and the inside of the liquid trap as defined above.

The tank shutoff valve or tank isolating valve is preferably opened when the pressure in the gas compartment or headspace decreases due to the hydrostatic pressure of a fuel column whose level corresponds to the difference in height between the highest and lowest point of the suction line.

A further possibility to generate negative pressure in the gas compartment or headspace, i.e., a negative pressure gradient between the gas compartment or headspace and the inside of the liquid trap, is to suction gas or a gas mixture present in the gas compartment or headspace, from the gas compartment or headspace. For this purpose, the gas compartment or headspace may be connected directly to the combustion engine's intake tract via a suction line having a controllable shutoff valve, and the shutoff valve can be opened when the tank shutoff or isolating valve is in a closed position in order to generate a negative pressure in the gas compartment or headspace.

Advantageously, the suction line between the gas compartment or headspace and the liquid trap may not only be used to suction the liquid fuel from the liquid trap, but may also be used as a vent line to vent the fuel tank during refueling or during an increase of pressure due to an increase of the ambient temperature.

According to another aspect of the present invention a fuel system for a motor vehicle includes a fuel tank having a gas compartment or headspace; a liquid fuel trap situated within the fuel tank for separation of liquid fuel during venting of the fuel tank, wherein the liquid trap includes a collection container for collection of the liquid fuel separated by the liquid trap, said gas compartment or headspace of the fuel tank being connected to the liquid fuel trap by a suction line which communicates with the collection container.

In the fuel system according to the invention, the gas compartment or headspace of the fuel tank is connected with the liquid trap through a suction line which communicates with the collection container, so that in case of a negative pressure in the gas compartment or headspace liquid fuel is suctioned from the collection container through the suction line. The end of the line, situated in the gas compartment or headspace, is provided with a tank vent valve and a filling level limitation valve so that the line may not only be used as a suction line but also a vent line.

Where the usage of a single line is insufficient to suction a sufficient amount of fuel from the liquid trap due to larger line cross sections, an advantageous embodiment of the invention provides that the line branches into multiple parallel branch lines with smaller line cross sections before entering the collection container, which branch lines then enter the liquid trap from the bottom of the collection container or from below.

In this case an advantageous embodiment of the invention provides that the line or the branch lines enter the collection container from below so that an end section of the line or branch lines extends upwards within the liquid trap through the collection container, leads into the liquid trap above the collection container or above the fuel level in the collection container and has a lateral aperture within the collection container through which liquid fuel can enter the line or the branch lines. This measure allows on one hand achieving a very good separating efficiency in the liquid trap, because no fuel is dragged along out of the liquid trap. On the other hand, only the volume of the liquid trap has to be displaced during refueling.

It is also advantageous when the capacity of the liquid trap or the collection container is adjusted to the maximum amount of liquid fuel generated during a hot dynamic drive and/or when an expansion volume is provided in a vent line leading from the liquid trap to the filler plug or filler tube of the fuel tank to ensure a low pressure level in the liquid trap.

When a connection is present between the filler plug or filler tube of the fuel tank and the liquid trap, a valve may advantageously be provided at the connection, which prevents a reverse suctioning of fuel from the filler tube into the liquid trap during emptying of the liquid trap. The valve preferably has three ports of which a first port communicates with the liquid trap, a second port with the filler plug or filler tube and a third port with the environment. The valve is designed so that on the one hand air can flow through the valve into the liquid trap when a negative pressure exists within the liquid trap and on the other hand gas or a gas mixture displaced through the liquid trap during refueling is conducted through the valve to the filler plug or filler tube.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
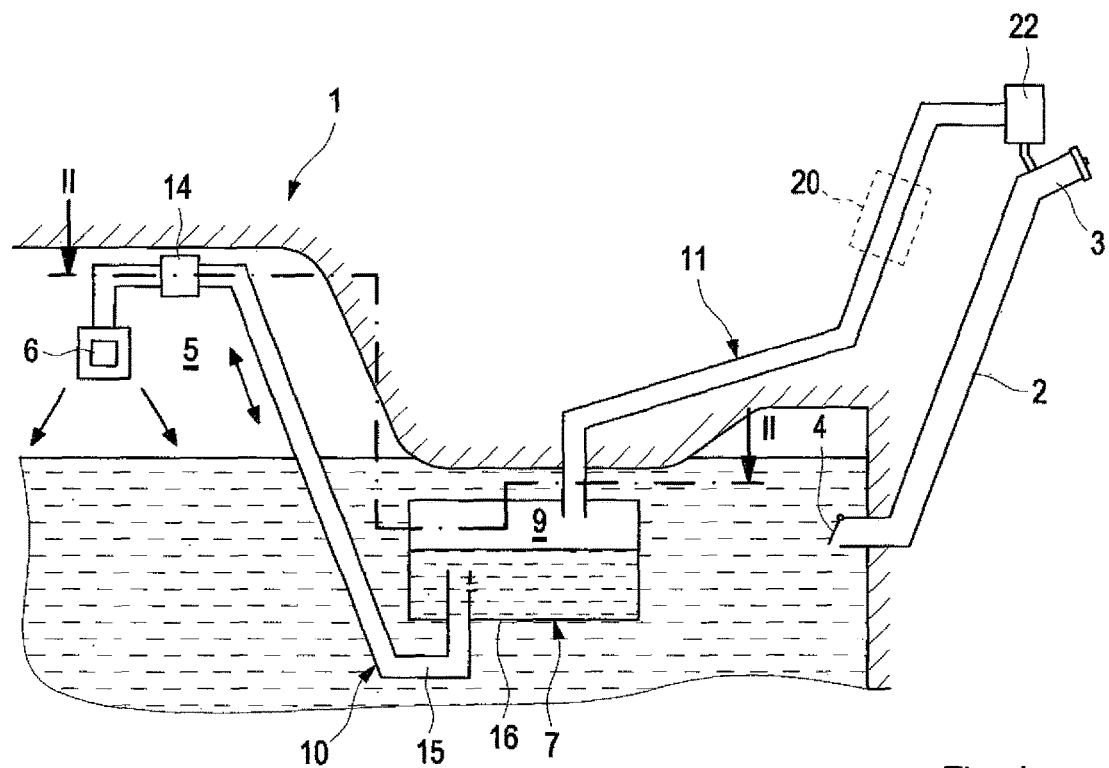
FIG. 1 shows a schematic sectional view of parts of a fuel system of a motor vehicle according to the invention including a liquid trap for separating liquid fuel during ventilation of the fuel tank.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The fuel system, which is only partially shown in the Figures, is intended for a motor vehicle with internal combustion engine. The fuel system includes a pressure-tight fuel tank 1, which is provided with a filler tube 2 for refueling, a pressure-tight lockable filling plug 3 and a flap 4 at its lower end.

The fuel tank 1 is provided with a tank venting device that enables venting of the fuel tank 1 during refueling of the motor vehicle and also when the ambient temperature decreases.

Figure 4:
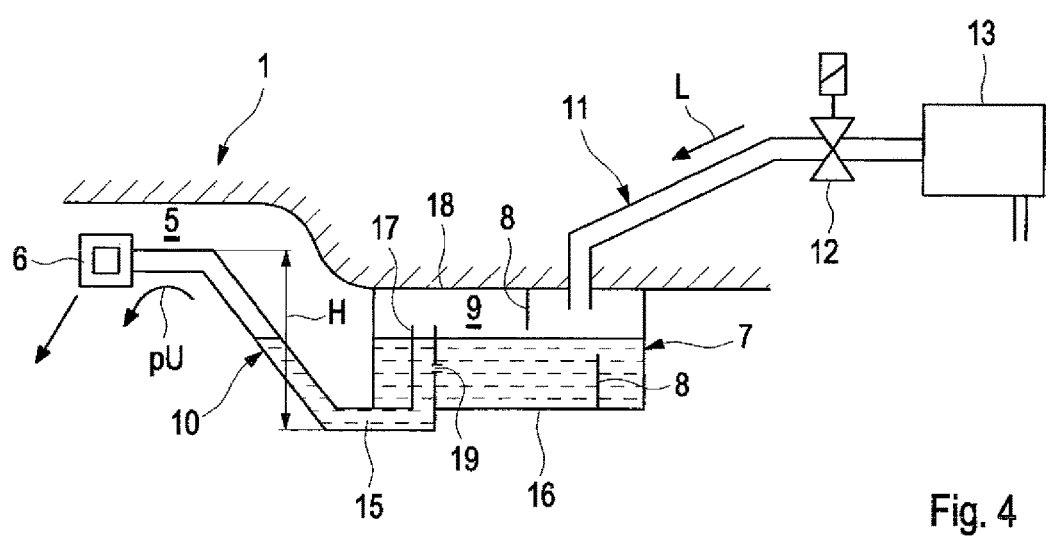
FIG. 4 shows a vertical view of the liquid trap and an air tube and vent and ventilation line having a tank shutoff and isolating valve and leading from the liquid trap to an activated carbon filter.

Within the tank 1, the fuel tank venting device includes a tank vent valve and filling level limitation valve 6 arranged in a gas compartment or head space 5 as well as a liquid trap 7 with a labyrinth 8 and a lower fuel collection container 9, which liquid trap 7 is connected to the valve 6 by a line 10, which serves as suction line and as internal fuel tank vent line. From above, an external ventilation and vent line 11 enters the liquid trap 7, and leads out of the tank 1 above the liquid trap 7. Outside of the tank 1, the tank venting device includes a tank shutoff and isolating valve 12 and an activated carbon filter 13a connected thereto (FIG. 4).

The tank shutoff and isolating valve 12 is normally closed and is opened in order to vent the fuel tank 1, to discharge the gas or gas mixture that has been displaced out of the gas compartment or headspace 5 during refueling of the fuel tank 1 into the environment. Furthermore, the tank shutoff and isolating valve 12 is opened under the control of an engine control unit of the internal combustion engine in order to vent the tank, when the pressure in the tank 1 exceeds a sellable overpressure threshold value for example as a result of an increase of the ambient temperature.

The activated carbon filter 13 prevents volatile hydrocarbons (HC) contained in the gas or gas mixture, which flows out of the tank 1 during venting the fuel tank 1, from escaping into the environment and for this purpose includes a filling of activated carbon that absorbs the volatile hydrocarbons (HC). The activated carbon filter 13 is regenerated by suctioning ambient air through the activated carbon filter 13 into an intake tract of the internal combustion engine in order to rinse the filter 13 and to combust the volatile hydrocarbons in the combustion chambers of the internal combustion engine.

The liquid trap 7 constitutes a liquid separator, which during venting of the tank 1 prevents liquid fuel from being carried along by the escaping gas or gas mixture to the activated carbon filter 13. The separated liquid fuel is collected in the fuel collection container 9 situated at the lower part of the liquid trap 7. A detailed description of the labyrinth 8 which serves for the separation is not given because the construction is the same compared to conventional liquid traps 7.

Due to the fact that excessive amounts of liquid fuel in the liquid trap 7 prevent a refueling of the motor vehicle, the liquid trap 7 or the fuel collection container 9 has to be emptied regularly. For this purpose a negative pressure is generated in the gas compartment or headspace 5 of the fuel tank 1, i.e., a negative pressure difference between the pressure existing in the gas compartment or headspace 5 and the pressure existing in the liquid trap 7. This negative pressure is applied to the liquid trap 7 through the line 10, whereby the liquid fuel located in the collection container 9 is at least partially suctioned through the line 10 and the vent and filling level limitation valve 6 into the gas compartment or headspace 5.

Figure 2:
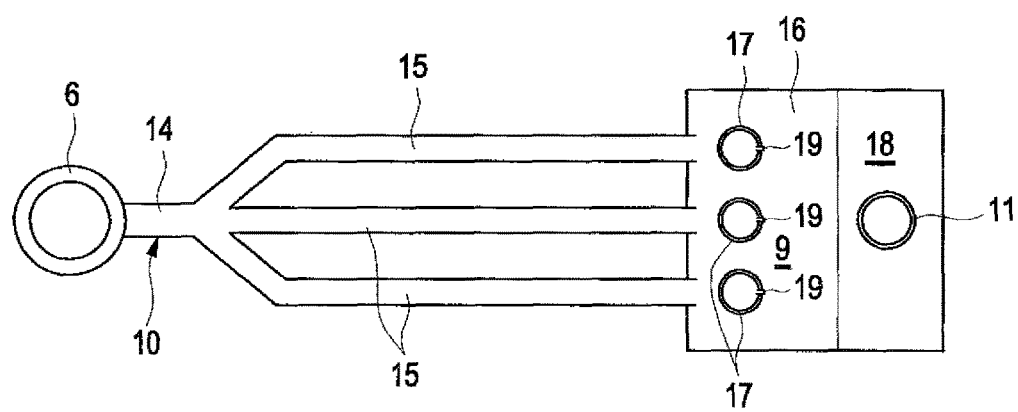
FIG. 2 shows an enlarged horizontal sectional view along line II-II in FIG. 1 with a top view onto the liquid trap and a suction line leading to the gas compartment or headspace.

To ensure an optimal suctioning of the fuel from the collection container 9, the line 10 may include a distributor 14 between the valve 6 and the liquid trap 7 in the gas compartment or headspace 5, in which the line 10 branches into several branch lines as shown in FIG. 2. The branch lines have a smaller diameter of about 8 mm.

Figure 3:
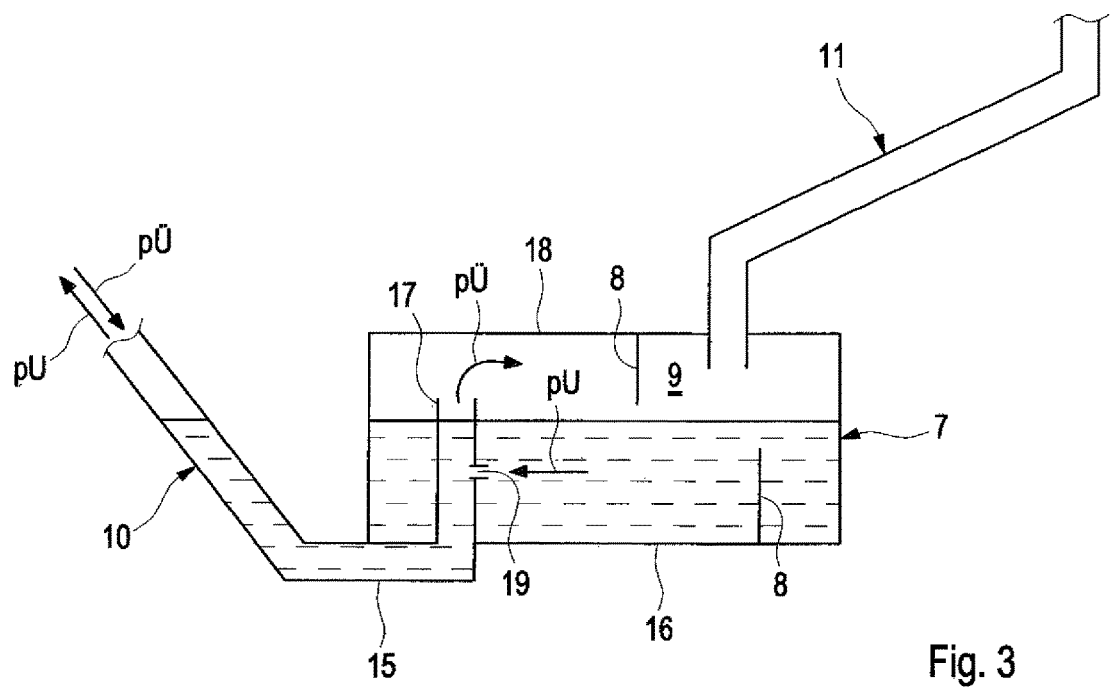
FIG. 3 shows an enlarged vertical sectional view of the liquid trap and a part of the suction line.

As best shown in FIGS. 1 and 3, the branch lines 15 extend from the distributor 14 downwards up to a bottom 16 of the collection container 9, from where their end sections 17 enter the liquid trap 7 upwardly through the bottom 16. The vertically oriented end sections 17 extend as dip tubes through the fuel located in the collection container 9 and upwards close to an upper partition wall 18 of the liquid trap 7, where they enter into the liquid trap 7 above the fuel level. In a small clearance above the bottom 16 the end sections 17 are each provided with a lateral bore 19 with a small opening cross section, through which liquid fuel can enter the branch lines 15 from the collection container 9.

The dimensions of the liquid trap 7 or the collection container are designed for the amount of fuel that may accrue during a hot dynamic drive of the motor vehicle. To prevent a pressure increase of the liquid trap 7, the ventilation and vent line 11 may include an expansion volume 20.

When a "positive pressure" exists in the gas compartment or headspace 5, i.e., when a positive pressure difference between the gas compartment or headspace 5 and the inside of the liquid trap 7 exists, for instance when the pressure in the gas compartment or headspace 5 increases due to an increase in the ambient temperature or during refueling, gas or gas mixture is pushed from the gas compartment or headspace 5 through the vent line 10 into the liquid trap 7, as shown in FIG. 3 by the arrows pÜ. When the tank shutoff and isolating valve 12 is opened, gas or gas mixture can escape into the environment through line 11 and the activated carbon filter 13.

When on the other hand a "negative pressure" exists, i.e., when a negative pressure difference between the gas compartment or headspace 5 and the inside of the liquid trap 7 exists, liquid fuel from the collection container 9 is suctioned through line 10, which functions as a suction line, from the liquid trap 7 into the gas compartment or headspace 5, as indicated by the arrows pÜ in FIG. 3. This pressure difference is used in a targeted manner to suction liquid fuel out of the liquid trap 7, by applying the negative pressure generated in the gas compartment or headspace 5 to the liquid trap 7 through line 10. As a result, the fuel that has entered the line 10 or branch lines 15 through the bore 19 is suctioned in the direction of the gas compartment or headspace 5, whereupon additional fuel can flow into the line 10 or branch line 15 through the bore 19.

The negative pressure is generated for instance when the tank cools down as a result of the decrease of the ambient temperature or when the fuel level in the tank decreases as a result of consumption of fuel in the internal combustion engine. When this negative pressure is sufficiently high so that it exceeds the hydrostatic pressure of a fuel column having a height H, the liquid trap 7 is emptied without further supporting measures. As shown in FIG. 4, the height H equals the difference in height between the highest and the lowest point of the line 10.

When the negative pressure is not sufficient to empty the liquid trap, the tank shutoff or isolating valve 12 may be opened as a supporting measure if there a negative pressure also exists between the inside of the liquid trap 7 and the environment. As shown in FIG. 4, this increases the negative pressure difference between the gas compartment or headspace 5 and the inside of the liquid trap 7. As a result of this additional negative pressure as well as the ambient air (arrow L in FIG. 4) flowing into the liquid trap 7, additional fuel is transported from the liquid trap 7 into the gas compartment or headspace 5.

Figure 5:
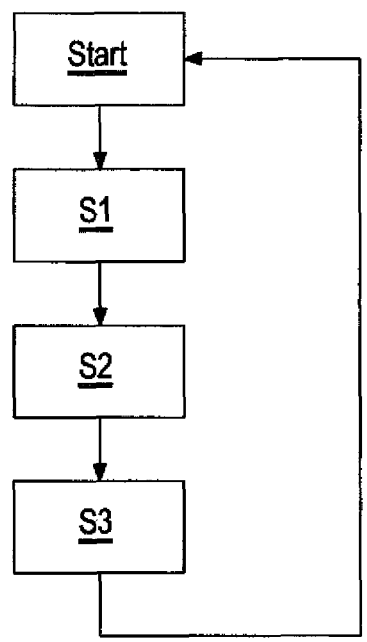
FIGS. 5a and 5b show two control loops for controlling the tank shutoff and isolating valves.
Figure 5:
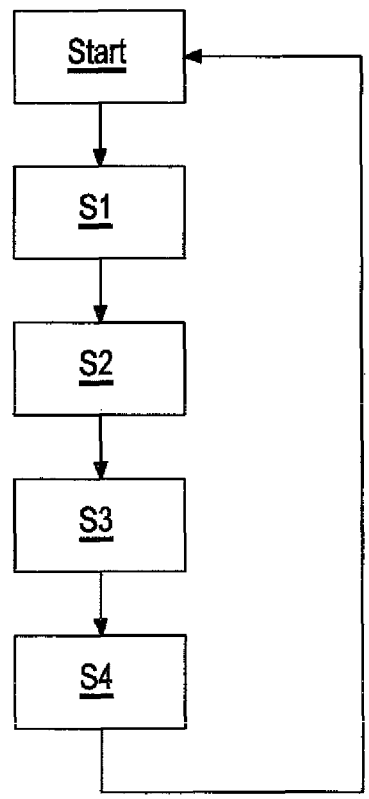

In the following the control of the opening and closing of the tank shutoff or isolating valve 5 in order to support the emptying of the liquid trap is described with reference to FIGS. 5a and 5b by way of two control loops, wherein the negative pressure in the gas compartment or headspace 5 in FIG. 5a is generated as a result of the fuel consumption of the internal combustion engine and in FIG. 5b as a result of the natural cooling process of the fuel tank 1.

In FIG. 5a, it is determined in a first step S1 after the start of the control loop, whether the pressure difference between the ambient pressure and the pressure in the gas compartment or headspace 5 is sufficient to transport the fuel from the liquid trap 7 over the height H into the gas compartment or headspace 5. If this is the case, the tank shutoff or isolating valve is opened in a second step S2, so that ambient air is able to flow into the liquid trap 7 and to thereby push liquid fuel from the collector plenum 9 towards the headspace or gas compartment 5. As soon as the liquid trap 7 is empty and the pressure in the gas compartment or headspace 5 equals the ambient pressure, the tank shutoff or isolating valve 12 is closed again in a third step S3. The control loop then returns to the starting point.

In FIG. 5b, it is determined in a first step S1, whether the temperature of the fuel tank 1 has exceeded a predetermined temperature threshold $T_S$ during a preceding hot dynamic drive that often leads to a filling of the liquid trap 7 with liquid fuel, and whether a tank pressure control is active. When both is the case, it is determined in a second step S2 whether the actual temperature $T_{IST}$ is below the temperature threshold $T_S$ by a predetermined degree. When this is the case, it may be concluded that the pressure difference between the ambient pressure and the pressure in the gas compartment or headspace 5 is sufficient to transport the fuel out of the liquid trap 7 over the height H into the gas compartment or headspace 5. In a third step S3 the tank shutoff or isolating valve 12 is opened so that ambient air can flow into the liquid trap 7 and push liquid fuel from the collection container 9 towards the headspace or gas compartment 5. As soon as the liquid trap 7 is empty and the pressure in the gas compartment or headspace 5 equals the ambient pressure, the tank shutoff or isolating valve 12 is closed again in a fourth step S4. The control loop then returns to the starting point.

Figure 6:
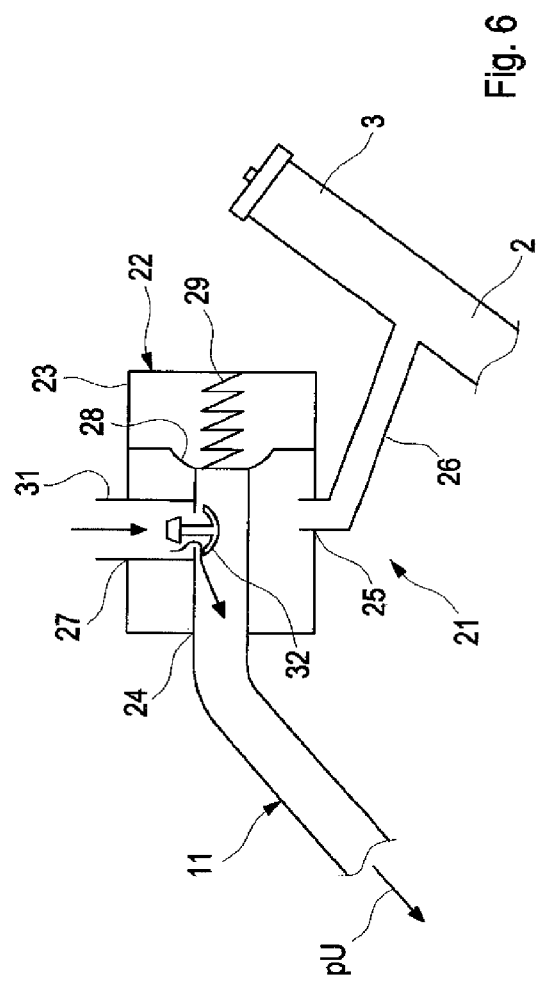
FIG. 6 shows a schematic view of parts of a fuel system according to the invention with a connection between the gas compartment or headspace and a filler plug or filler tube of the fuel tank with the filler plug being closed.
Figure 7:
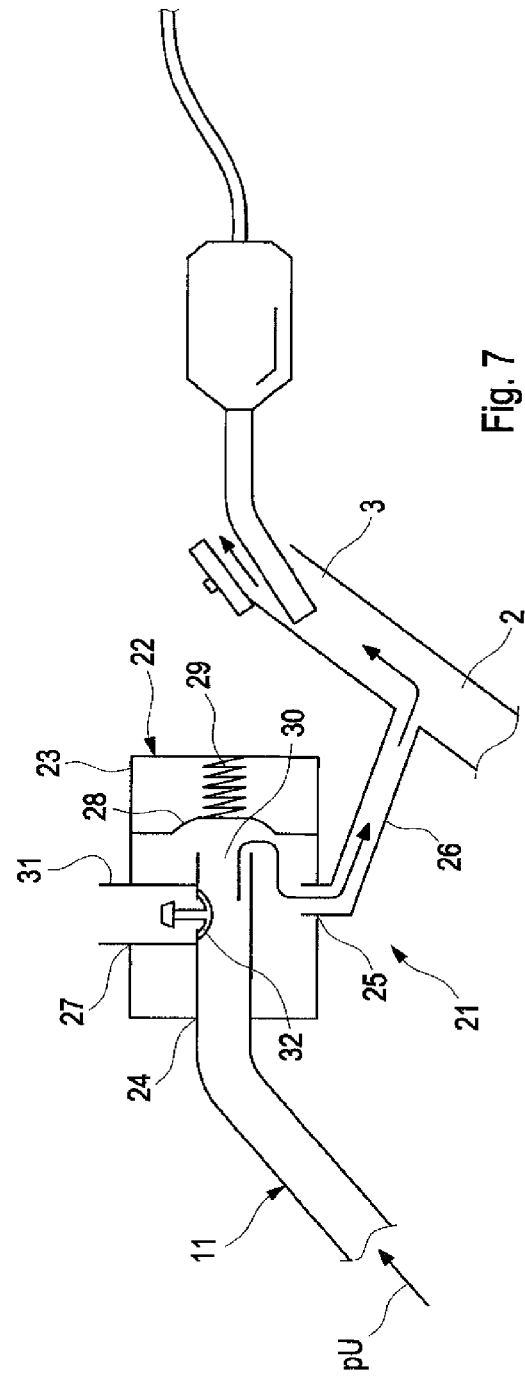
FIG. 7 shows a view as in FIG. 6 however during the refueling of the fuel tank.
Figure 8:
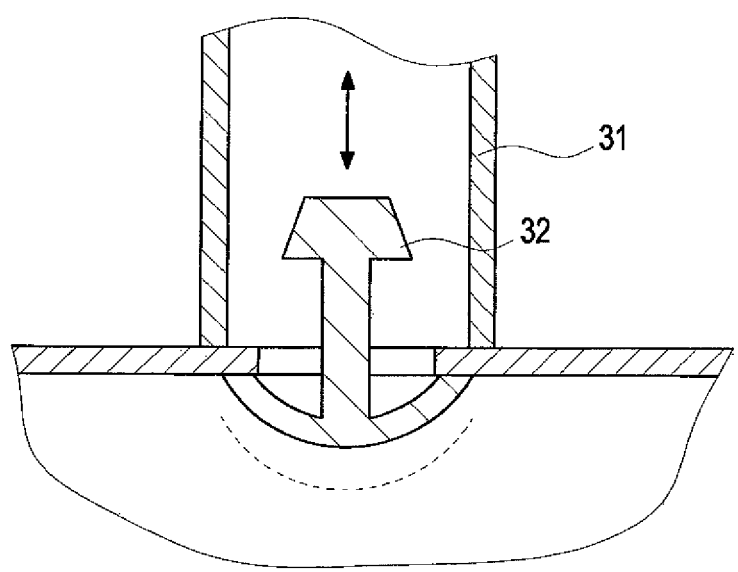
FIG. 8 shows an enlarged sectional view from FIGS. 6 and 7.

FIGS. 6 to 8 show parts of a fuel system in which a connection 21 is present between the filling tube 2 or the filling plugs 3 and the ventilation and vent line. As shown in FIGS. 6 and 7 this connection 21 includes a valve 22 by which a reverse suction of fuel from the filling tube 3 into the liquid trap 7 can be avoided.

The valve 22 has a valve body 23 with a first connection 24, which communicates through the line 11 with the liquid trap 7, a second connection 25, which communicates with the filler plugs 3 or filler tube 2 through a connecting line 26, and a third connection 27 that directly communicates with the environment. The valve 22 further has a deformable membrane 28 which, in a first position (FIG. 6), is pressed by a spring 29 against a frontal aperture 30 of the line 11 extending into the valve body 23 thereby closing the line 11 and which, in a second position (FIG. 7) is lifted off the aperture 30. From the third connection 27, a tube 31 extends through the valve body 23 up to the line 11 and laterally leads into it. At the point of entry, a lightweight locking element 32 is provided which is moveable upwards and downwards and which moves due to its own weight into a lower final position, shown in FIG. 6, when the membrane 28, in its closed position, seals the aperture 30 and disconnects the connection between the line 11 and the filler plugs 3. In this position, ambient air can flow during the emptying of the liquid trap 7 through the tube 31 into the vent line 11 and into the liquid trap 7 so that no fuel can be suctioned from the filler plugs 3 or filler tube 2.

When the fuel tank 1 is refueled while the filler plugs 3 are opened, as shown in FIG. 7, the gas or gas mixture which was displaced from the headspace or gas compartment 5 and which flows through the liquid trap 7 into the line 11, presses the membrane 28 against the pressure of the spring 29 into its open position, in which the gas or gas mixture can flow through the connecting line 26 into the filler plugs 3. As a result, the locking element 32 is lifted and seals the tube 31 so that no gas or gas mixture escapes into the environment.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for suctioning liquid fuel from a liquid trap in a fuel tank of a motor vehicle, comprising:
   generating a negative pressure in a gas compartment or headspace of the fuel tank;
   applying the negative pressure to the liquid trap through a suction line, said liquid trap having a collection container collecting liquid fuel during venting of the fuel tank, said suction line branching into a plurality of parallel branch lines with smaller line cross sections before entering the collection container, said branch lines entering the collection container through a bottom of the collection container, wherein end sections of the branch lines extend in the collection container upwards and have lateral apertures for passage of liquid fuel therethrough into the branch lines; and
   at least partially suctioning the liquid fuel located in the collection container through the suction line into the gas compartment or headspace.

2. The method of claim 1, wherein the negative pressure in the gas compartment or headspace is generated as a result of cooling of the fuel tank, with the fuel tank being closed gas-tight.

3. The method of claim 1, wherein the negative pressure in the gas compartment or headspace is generated as a result of consumption of fuel in an internal combustion engine of the motor vehicle, with the fuel tank being closed gas-tight.

4. The method of claim 1, wherein the negative pressure in the gas compartment or headspace is generated by suctioning gas or a gas mixture from the gas compartment or headspace, with the fuel tank being gas-tightly closed.

5. The method of claim 4, wherein the gas or gas mixture is suctioned into an intake tract of an internal combustion engine of the motor vehicle.

6. The method of claim 1, further comprising supporting the suctioning of the liquid fuel from the liquid trap by opening a closed tank shutoff or isolating valve.

7. A fuel system for a motor vehicle, comprising:
   a fuel tank having a gas compartment or headspace; and
   a liquid fuel trap situated within the fuel tank for separation of liquid fuel during venting of the fuel tank, said liquid trap comprising a collection container for collection of the liquid fuel separated by the liquid trap, said gas compartment or headspace of the fuel tank being connected to the liquid fuel trap by a suction line which communicates with the collection containers, said suction line branching into a plurality of parallel branch lines with smaller line cross sections before entering the collection container, said branch lines entering the collection container through a bottom of the collection container, wherein end sections of the branch lines extend in the collection container upwards and have lateral apertures for passage of liquid fuel therethrough into the branch lines.

8. The fuel system of claim 7, wherein an end of the suction line is situated in the gas compartment or headspace and is provided with a tank vent valve and filling level limitation valve.

9. The fuel system of claim 7, wherein the liquid trap is connected to an activated carbon filter through a vent line, said vent line containing an expansion volume and/or a tank shutoff or isolating valve for preventing a pressure increase in the collection container.

10. The fuel system of claim 7, further comprising an automatically operating valve arranged between the liquid trap and a filler plug or filler tube of the fuel tank, said automatically operating valve comprising a first port communicating with the liquid trap, a second port communicating with the filler plug or filler tube, and a third port communicating with an environment of the motor vehicle.

11. The fuel system of the claim 7, further comprising a further suction line between the gas compartment or headspace of the fuel tank and an intake tract of a combustion engine of the motor vehicle, said further suction line comprising a shutoff valve.

* * * * *